United States Patent
Nakao

(10) Patent No.: US 8,503,982 B2
(45) Date of Patent: Aug. 6, 2013

(54) MOBILE TERMINAL AND LOCKED STATE CANCELLING METHOD

(75) Inventor: Masayoshi Nakao, Daito (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/357,273

(22) Filed: Jan. 24, 2012

(65) Prior Publication Data
US 2012/0190336 A1    Jul. 26, 2012

(30) Foreign Application Priority Data
Jan. 25, 2011  (JP) .................... 2011-012622

(51) Int. Cl.
*H04W 24/00* (2009.01)
*H04W 12/00* (2009.01)

(52) U.S. Cl.
USPC .......................................... 455/411; 715/863

(58) Field of Classification Search
USPC ............... 455/410–411, 414.1–414.2, 466, 455/550.1, 566; 715/741, 764, 773, 780, 715/833, 863–864; 345/156–158
See application file for complete search history.

(56) References Cited

U.S. PATENT DOCUMENTS

| | | | |
|---|---|---|---|
| 2005/0212767 A1* | 9/2005 | Marvit et al. | 345/158 |
| 2007/0150842 A1* | 6/2007 | Chaudhri et al. | 715/863 |
| 2010/0162182 A1* | 6/2010 | Oh et al. | 715/863 |
| 2011/0187727 A1* | 8/2011 | Ahn et al. | 345/473 |

FOREIGN PATENT DOCUMENTS

| | | | |
|---|---|---|---|
| GB | 2347593 A | * | 9/2000 |
| JP | 2007-116318 A | | 5/2007 |

* cited by examiner

*Primary Examiner* — Kashif Siddiqui
(74) *Attorney, Agent, or Firm* — Procopio, Cory, Hargreaves & Savitch LLP

(57) ABSTRACT

A mobile phone apparatus is provided with an accelerometer for detecting an attitude and a display for displaying a moving object. Furthermore, a key locked state is set to the mobile phone apparatus for the purpose of preventing an operating error in the key. When an arbitrary key is operated in the key locked state, the moving object and a pocket object representing a predetermined area, etc. are displayed on the display. Then, when the moving object changes in position in correspondence with the change of the attitude of the mobile phone apparatus and is put into the pocket object, the key locked state is cancelled.

20 Claims, 12 Drawing Sheets

MOBILE TERMINAL AND LOCKED STATE CANCELLING METHOD

CROSS REFERENCE TO RELATED APPLICATION

This application claims priority under 35 U.S.C. Section 119 to Japanese Patent Application No. 2011-12622, filed on Jan. 25, 2011. The disclosure of the above application is incorporated herein by reference.

BACKGROUND OF THE INVENTION

1. Field of the Invention

The present invention relates to a mobile terminal. Specifically, the present invention relates to a mobile terminal capable of setting a locked state.

2. Description of the Related Art

Conventionally, mobile terminals capable of setting the locked state have been widely known, and one example of such an apparatus is disclosed in a Japanese Patent Application Laying-Open No. 2007-116318 [H04M 1/00, H04Q 7/38] laid-open on May 10, 2007. The mobile phone of the related art can set and cancel a lock function of the mobile phone, recognizing a moving pattern of the mobile phone as personal identifying information.

However, in the related art, the user cannot know whether or not the moving pattern when he or she moves the mobile phone is correctly input as intended. Thus, the user may not cancel the lock function smoothly.

SUMMARY OF THE INVENTION

A first aspect of the invention is a mobile terminal capable of setting a locked state and having a detector to detect an attitude and a displayer to display a moving object on a screen, comprising: a setter which sets a predetermined area on the screen; a changer which changes an on-screen position of the moving object on the basis of changes of the attitude detected by the detector; a determiner which determines whether or not the on-screen position of the moving object and the predetermined area have a predetermined relationship; and a canceller which cancels the locked state when the determiner determines that the on-screen position of the moving object and the predetermined area have the predetermined relationship.

A second aspect of the invention is a locked state cancelling method of a mobile terminal capable of setting a locked state and having a detector to detect an attitude and a displayer to display a moving object on a screen, comprising: setting a predetermined area on the screen; changing an on-screen position of the moving object on the basis of changes of the attitude detected by the detector; determining whether or not the on-screen position of the moving object and the predetermined area have a predetermined relationship; and cancelling the locked state when the determiner determines that the on-screen position of the moving object and the predetermined area have the predetermined relationship.

According to the first and second aspects of the invention, a user can easily perform an appropriate operation for cancelling the locked state.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

<First Embodiment>

Figure 1:
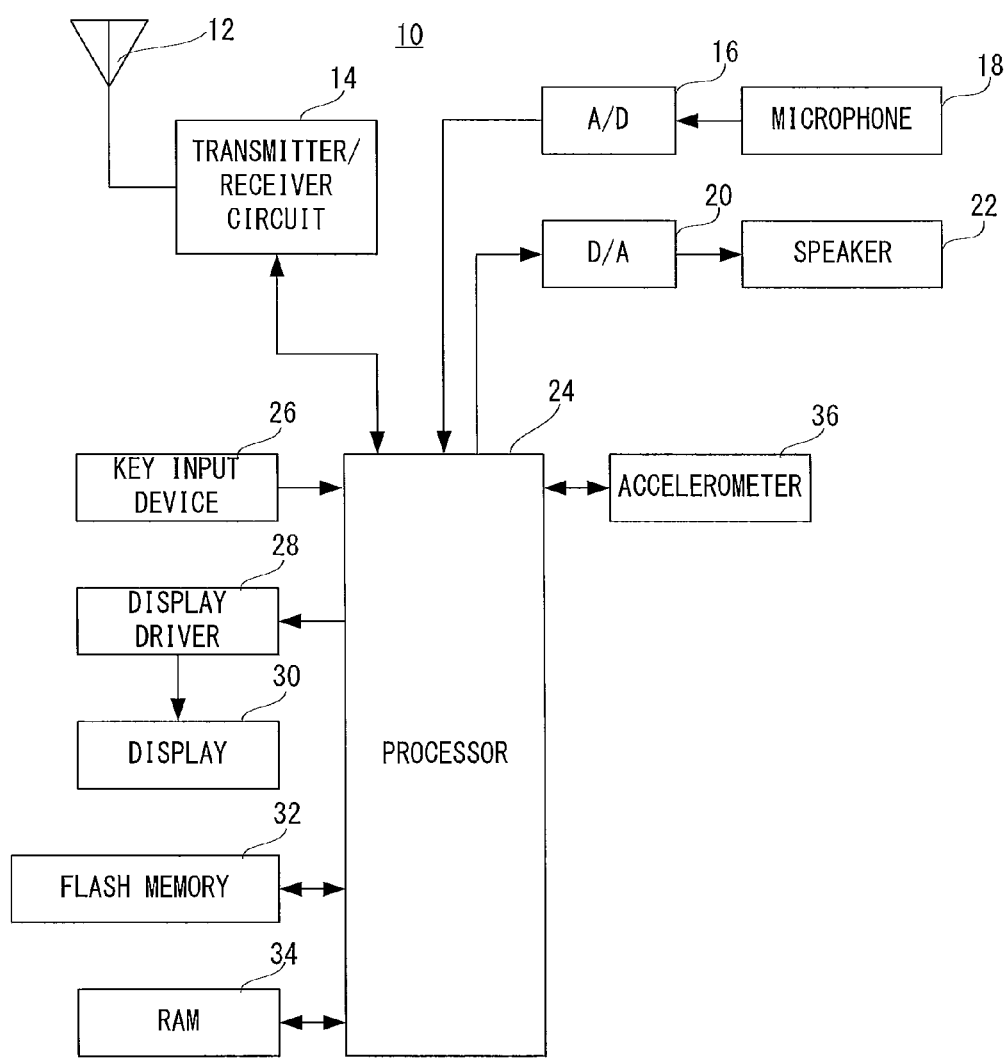
FIG. 1 is an illustrative view showing an electric configuration of a mobile phone apparatus of one embodiment of the present invention.

Referring to FIG. 1, a mobile phone apparatus 10 of this embodiment is one kind of mobile communication terminals, and includes a processor 24 which is called a computer or a CPU. Furthermore, the processor 24 is connected with a transmitter/receiver circuit 14, an A/D converter 16, a D/A converter 20, a key input device 26, a display driver 28, a flash memory 32, a RAM 34, and an accelerometer 36. The transmitter/receiver circuit 14 is connected with an antenna 12, the A/D converter 16 is connected with a microphone 18, and the D/A converter 20 is connected with a speaker 22. Furthermore, the display driver 28 is connected with a display 30 which is also called displayer.

The processor 24 entirely controls the mobile phone apparatus 10. The RAM 34 is utilized as a work area (including depiction area) or a buffer area of the processor 24. In the flash memory 32, content data of characters, images, voices, sounds, and video images of the mobile phone apparatus 10 are recorded.

The A/D converter 16 converts an analog voice signal relative to a voice or a sound that is input through the microphone 18 connected to the A/D converter 16 into a digital voice signal. The D/A converter 20 converts (decodes) a digital voice signal into an analog voice signal, and applies the converted signal to the speaker 22 via an amplifier not shown. Accordingly, a voice or a sound corresponding to the analog voice signal is output from the speaker 22. Here, the processor 24 controls an amplification factor of the amplifier to thereby adjust the volume of the voice output from the speaker 22.

The key input device 26 is called an operator, and is provided with a shutter key for photographing, a cursor key, an off-hook key and an on-hook key. Information of the key (key data) operated by a user is input to the processor 24. Also, when any key included in the key input device 26 is operated, a clicking sound is produced. Accordingly, the user can have an operational feeling with respect to the key operation by listening to the clicking sound.

The display driver 28 controls display of the display 30 connected to the display driver 28 under the instruction of the processor 24. Also, the display driver 28 includes a video memory (not illustrated) for temporarily storing image data to be displayed.

Figure 2:
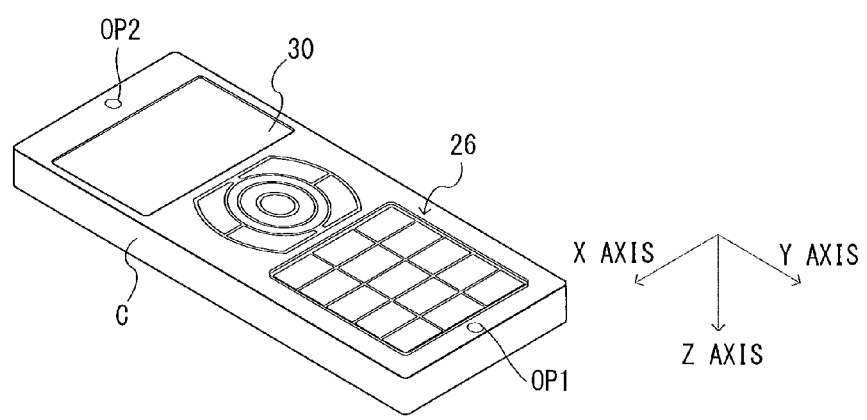
FIG. 2 is an illustrative view showing one example of an appearance of the mobile phone apparatus shown in FIG. 1.

The accelerometer 36 is a semiconductive three-axis accelerometer, and outputs a acceleration data of three axes shown in FIG. 2 to the processor 24. Furthermore, the processor 24 calculates the attitude, that is, the angle of the mobile phone apparatus 10 by utilizing an inverse trigonometric function with respect to the values indicated by the three-axis acceleration data. Thus, the accelerometer 36 may be called a detector for detecting an attitude of the mobile phone apparatus 10.

The transmitter/receiver circuit 14 is a circuit for making wireless communications according to a CDMA system. For example, when an outgoing call is instructed by the user using the input device 26, the transmitter/receiver circuit 14 executes outgoing call processing under the instruction of the processor 24 and outputs an outgoing call signal via the antenna 12. The outgoing call signal is sent to a phone of a communication partner through base stations and communication networks (not illustrated). Then, when incoming call processing is performed by the phone of the communication partner, a speech possible state is established, and the processor 24 executes speech communication processing.

Normal speech communication processing is explained in detail. A modulated voice signal transmitted from the phone of the communication partner is received by the antenna 12. The received modulated audio signal undergoes demodulation processing and decode processing by the transmitter/receiver circuit 14. Then, the received voice signal acquired through such processing is converted into an analog voice signal by the D/A converter 20, and then output from the speaker 22. On the other hand, a voice signal to be transmitted that is captured through the microphone 18 is converted into a digital voice signal by the A/D converter 16, and then applied to the processor 24. The voice signal to be transmitted which has been converted into a digital voice signal undergoes encoding processing and modulation processing by the transmitter/receiver circuit 14 under the control of the processor 24 and is output via the antenna 12. Thus, the modulated audio signal is sent to the phone of the communication partner via base stations and communication networks.

Furthermore, when an outgoing call signal from the communication partner is received by the antenna 12, the transmitter/receiver circuit 14 notifies an incoming call to the processor 24. In response thereto, the processor 24 controls the display driver 28 to display calling source information (phone number, etc.) described in the incoming call notification on the display 30. Furthermore, at almost the same time, the processor 24 outputs a ringing tone (ringing melody, ringing voice) from a speaker not shown.

Then, when the user performs an answer operation by using the off-hook key, the transmitter/receiver circuit 14 executes incoming call processing under the instruction of the processor 24. Then, when a speech possible state is established, the processor 24 executes the above-described normal speech communication processing.

Furthermore, when a speech communication end operation is performed by the on-hook key after a shift to the speech possible state, the processor 24 sends a speech communication end signal to the communication partner by controlling the transmitter/receiver circuit 14. After sending the speech communication end signal, the processor 24 ends the speech communication processing. Furthermore, in a case that a speech communication end signal from the communication partner is first received as well, the processor 24 ends the speech communication processing. In addition, in a case that a speech communication end signal from the mobile communication network is received independent of the communication partner, the processor 24 ends the speech communication processing.

FIG. 2 is an illustrative view showing an appearance of the mobile phone apparatus 10. Referring to FIG. 2, the mobile phone apparatus 10 has a straight shape, and has a case C taking shape of a planar rectangle. The microphone 18 not shown is contained in the case C, and an opening OP1 passing through the contained microphone 18 is provided at one end of the longitudinal direction of the case C. Similarly, the speaker 22 not shown is contained in the case C, and an opening OP2 passing through the contained speaker 22 is at the other end of the longitudinal direction of the case C on the one main surface. The display 30 is provided such that the monitor screen is viewable from a side of the top of the case C. The key input device 26 has a talk key, the on-hook key, a cursor key, a decision key, a dial key, etc. These keys are provided on the top surface of the case C.

For example, the user inputs a phone number by performing a key operation on the dial key, and performs a voice transmitting operation with a push of the talk key. Then, after completion of the speech communication, the user performs a speech communication end operation with a push of the on-hook key. Furthermore, the user displays a menu screen, etc. on the display 30 by operating both of the GUI displayed on the display 30, and the cursor key and the decision key in combination. In addition, the user holds the on-hook key on to thereby switch the power of the mobile phone apparatus 10 between ON and OFF. Thus, on the basis of key data output from the key input device 26, the processor 24 displays an image based on the key data, and executes the function.

It should be noted that in FIG. 2, the accelerometer 36 detects accelerations of the three axes of a longitudinal direction (Y-axis direction), a lateral direction (X-axis direction) and a depth direction (Z-axis direction) of the mobile phone apparatus 10. It should be noted that the antenna 12, the transmitter/receiver circuit 14, the A/D 16, the D/A 20, the processor 24, the display driver 28, the flash memory 32, the RAM 34 and the accelerometer 36 are contained in the case C, and are not illustrated in FIG. 2.

Here, when the mobile phone apparatus 10 of the present embodiment is left for a predetermined time without any operation, or when the on-hook key is pushed in the standby condition, a transition to a key locked state for reducing an operating error to the key input device 26 is made. Then, when a key operation is performed on the key input device 26 while the key locked state is set to the mobile phone apparatus 10, a lock screen shown in FIG. 3(A) is displayed on the display 30.

It should be noted that when key data is output from the key input device 26 in the key locked state, the processor 24 displays the lock screen irrespective of the key data. Then, when the key locked state is cancelled, the processor 24 normally executes a function based on the key data, and displays an image.

Figure 3:
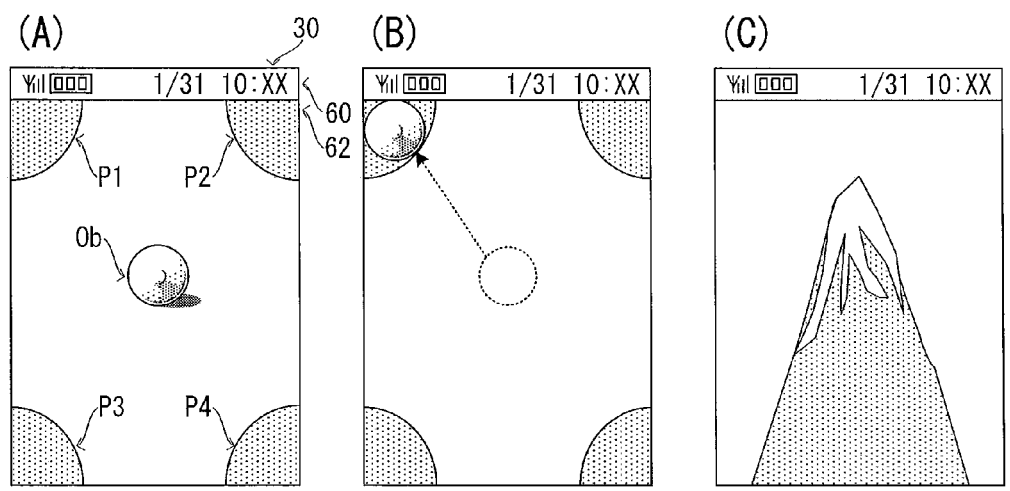
FIG. 3 is an illustrative view showing one example of a process of cancelling a key locked state set to the mobile phone apparatus shown in FIG. 1.

With reference to FIG. 3(A), a display of the display 30 is made up of a state displaying area 60 including a date and time, a remaining capacity of a battery and a receiving state, etc. and a function displaying area 62 on which the lock screen is to be displayed. Furthermore, on the lock screen, a moving object Ob which looks like a ball is displayed in the approximately center, and in each corner of the lock screen (function displaying area 62), each pocket object P1-P4 representing a predetermined area is provided. Here, noted that in other drawings, reference numerals may be omitted for simplicity.

An on-screen position of the moving object Ob changes depending on changes of the attitude of the mobile phone apparatus 10. For example, when the attitude changes about the Y-axis as shown in FIG. 2, the moving object Ob moves right and left. Also, when the attitude changes about the X-axis, the moving object Ob moves up and down. It should be noted that if the pocket objects P1-P4 are not identified with each other, it is simply referred to as "pocket object P" hereafter. Here, the pocket object P may be called a "cancellation object".

Furthermore, the "on-screen position of the moving object Ob" is the position of the center of gravity of the design representing the moving object Ob. Then, whether or not the position of the center of gravity is placed in a display area is determined by a function using the arithmetic operation that has widely and generally been used. Also, a technique of changing a position of the displayed object on the screen by using the accelerometer 36 has been widely and generally used, and thus, a detailed description is omitted.

Now, in this embodiment, when the moving object Ob and the pocket object P (predetermined area) has a predetermined relationship, the key locked state of the mobile phone apparatus 10 is cancelled.

With reference to FIG. 3(B), in the first embodiment, the on-screen position of the moving object Ob enters the predetermined area represented by the pocket object P, it is determined that a predetermined relationship is established to thereby cancel the locked state. Furthermore, when the key locked state is cancelled, a standby screen shown in FIG. 3(C) is displayed on the display 30. Entering of the on-screen position of the moving object Ob into the predetermined area represented by the pocket object P is referred to "putting the object Ob into the pocket object P".

Also, when the on-screen position of the moving object Ob is put into the pocket object P, the display of the moving object Ob is erased. This makes it possible to make the user feel as if the ball representing the moving object Ob falls into a hole.

Thus, by viewing a movement of the moving object Ob displayed on the display 30, the user can know whether or not his or her own operation is reflected as intended.

Furthermore, the user can cancel the key locked state by a mere simple operation of putting the moving object Ob displayed on the display 30 into the pocket object P. Specifically, the attitude of the mobile phone apparatus 10 can be changed by a single hand, and therefore, the user can easily cancel the key locked state of the mobile phone apparatus 10 with a single-handed operation.

Moreover, by utilizing the moving object Ob that looks like a ball and the pocket object P that looks like a hole, a cancel of the key locked state is instructed without use of the language.

Figure 4:
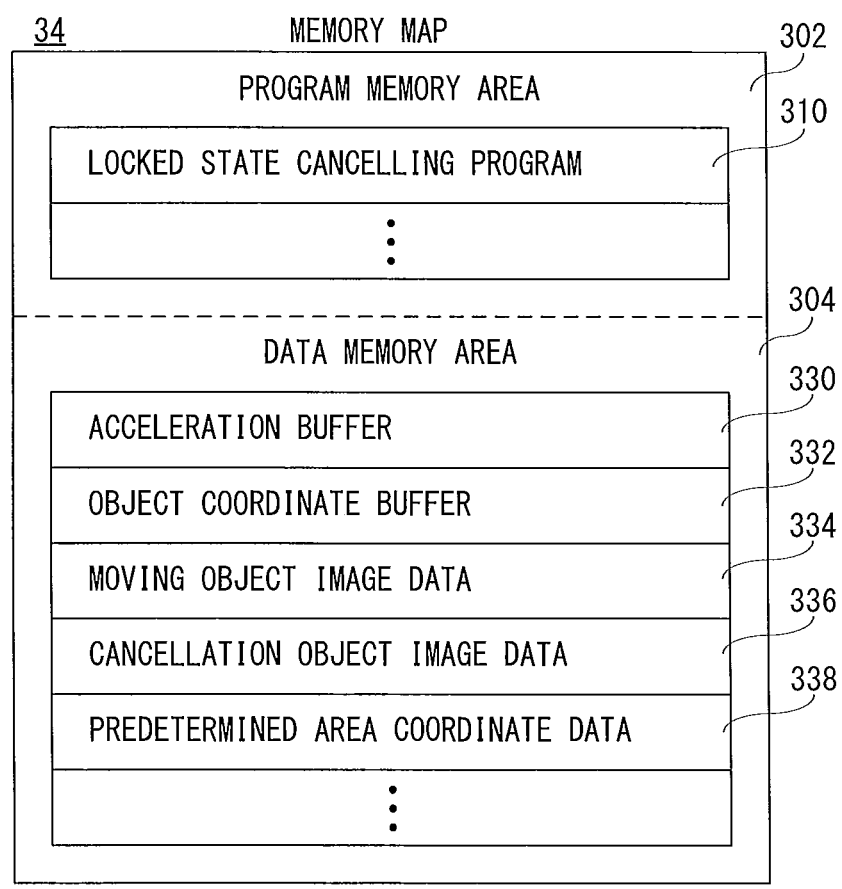
FIG. 4 is an illustrative view showing one example of a memory map of a RAM shown in FIG. 1.

FIG. 4 is an illustrative view showing a memory map of the RAM 34. In the memory map of the RAM 34, a program memory area 302 and a data memory area 304 are included. A part of programs and data are read entirely at a time, or partially and sequentially as necessary from the flash memory 32, stored in the RAM 34, and then executed by the processor 24, etc.

In the program memory area 302, a program for operating the mobile phone apparatus 10 is stored. For example, the program for operating the mobile phone apparatus 10 is made up of a locked state cancelling program 310, etc. The locked state cancelling program 310 is a program for cancelling the key locked state set to the mobile phone apparatus 10.

Although illustration is omitted, the program for operating the mobile phone apparatus 10 includes a program for notifying an incoming call state, a program for making communications with the outside, etc.

Succeedingly, in the data memory area 304, an acceleration buffer 330, an object coordinate buffer 332, etc. are provided, and moving object image data 334, cancellation object image data 336, predetermined area coordinate data 338, etc. are stored.

In the acceleration buffer 330, acceleration values of three axes output from the accelerometer 36 are temporarily stored. In the object coordinate buffer 332, coordinates indicating the on-screen position of the moving object Ob are temporarily stored.

The moving object image data 334 is image data indicating the moving object Ob. Furthermore, the cancellation object image data 336 is image data indicating the pocket objects P1-P4 in the first embodiment. In addition, the predetermined area coordinate data 338 is coordinate data of a predetermined area (coordinate range) representing each of the pocket objects P1-P4.

Although illustration is omitted, in the data memory area 304, image data and character string data that are to be displayed in the standby condition are stored, and counters and flags necessary for operations of the mobile phone apparatus 10 are also provided.

Figure 5:
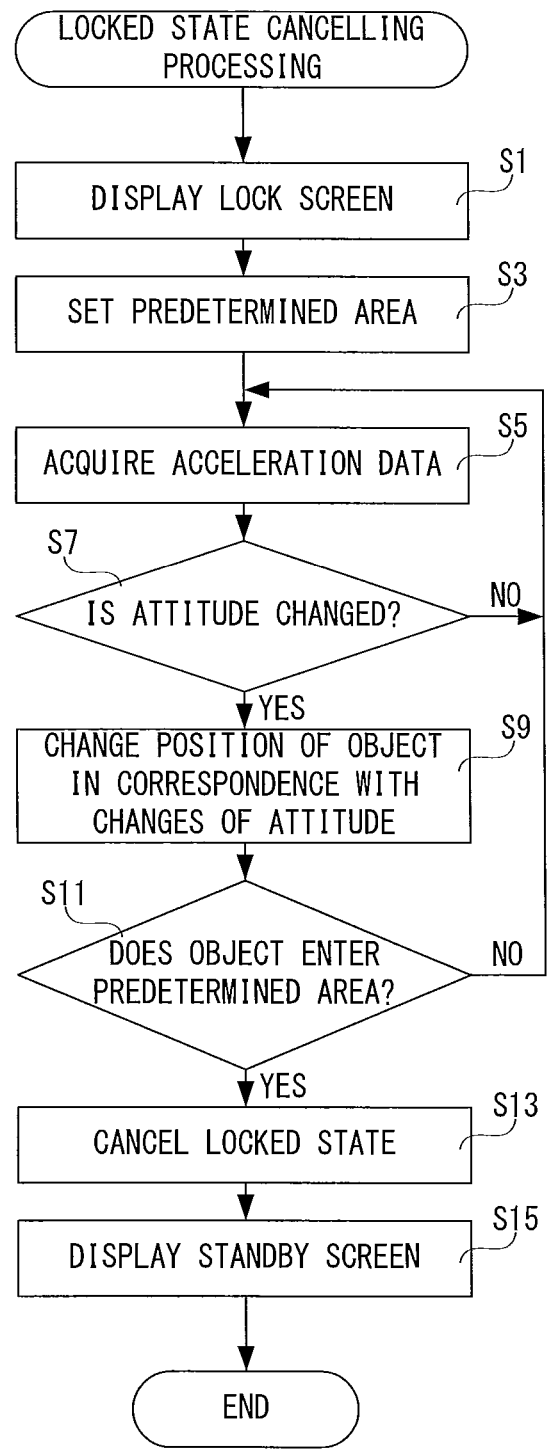
FIG. 5 is a flowchart showing one example of locked state cancelling processing by a processor shown in FIG. 1.

The processor 24 executes a plurality of tasks in parallel including locked state cancelling processing, etc. shown in FIG. 5 under the control of Linux (registered trademark)-based OSes, such as Android (registered trademark), REX, etc. and other OSes.

FIG. 5 is a flowchart showing the locked state cancelling processing. For example, when a key operation is performed on the key input device 26 while the key locked state is set to the mobile phone apparatus 10, the processor 24 displays the lock screen in a step S1. For example, the lock screen including the moving object Ob is displayed on the display 30. Succeedingly, in a step S3, a predetermined area is set. That is, on the lock screen, the coordinates indicated by the predetermined area coordinate data 338 is set as a predetermined area utilized for cancelling the key locked state. Then, each of the images of the pocket objects P1-P4 based on the cancellation object image data 336 is displayed so as to be lined with the set predetermined area on the display 30.

Succeedingly, in a step S5, acceleration data is acquired. That is, acceleration data of each axis is read from the acceleration buffer 330. Then, in a step S7, it is determined whether or not the attitude is changed. That is, it is determined whether or not the read acceleration data changes. If "NO" in the step S7, that is, if the attitude of the mobile phone apparatus 10 is not changed, the process returns to the step S5.

On the other hand, if "YES" in the step S7, that is, if the attitude of the mobile phone apparatus 10 is changed, the on-screen position of the moving object Ob is changed depending on the change of the attitude in a step S9. Here, the processor 24 executing the processing in the step S9 is called a changer.

Succeedingly, in a step S11, it is determined whether or not the object enters the predetermined area. That is, the processor 24 determines whether or not the on-screen position of the moving object Ob that is temporarily stored in the object coordinate buffer 332 is included in the coordinate area represented by the predetermined area coordinate data 338. Here, the processor 24 executing the processing in the step S11 functions as a determiner.

If "NO" in the step S11, the moving object Ob does not enter the pocket object P, the process returns to the step S5. On the other hand, if "YES" in the step S11, that is, if the moving object Ob enters the pocket object P1 as shown in FIG. 3(B), for example, the key locked state is cancelled in a step S13. For example, the processor 24 erases the display of the moving object Ob and then cancels the key locked state. Furthermore, the processor 24 executing the processing in the step S13 functions as a canceller.

Succeedingly, in a step S15, a standby screen is displayed. That is, as shown in FIG. 3(C), the standby screen is displayed on the display 30. Then, after completion of the processing in the step S15, the locked state cancelling processing of the first embodiment is ended.

By executing such processing, in the first embodiment, the user can know whether or not his or her own operation is reflected as intended by viewing the movement of the moving object Ob displayed on the display 30. Furthermore, by merely putting the moving object Ob that looks like a ball into the pocket object P that looks like a hole, it is possible to cancel the key locked state.

Here, if the on-hook key or the like is operated during execution of the locked state cancelling processing, the locked state cancelling processing is suspended to turn the power of the display 30 off.

Furthermore, when the moving object Ob is put into the pocket object P, the key locked state may be cancelled without erasing the display of the moving object Ob.

Also, on the lock screen displayed in the step S1 of the locked state cancelling processing, the on-screen position of the moving object Ob and the display manner of the pocket object P are not restricted to only those shown in FIG. 3(A). For example, as shown in FIG. 6(A), an initial position of the moving object Ob may be displayed near the periphery of the lock screen.

Figure 6:
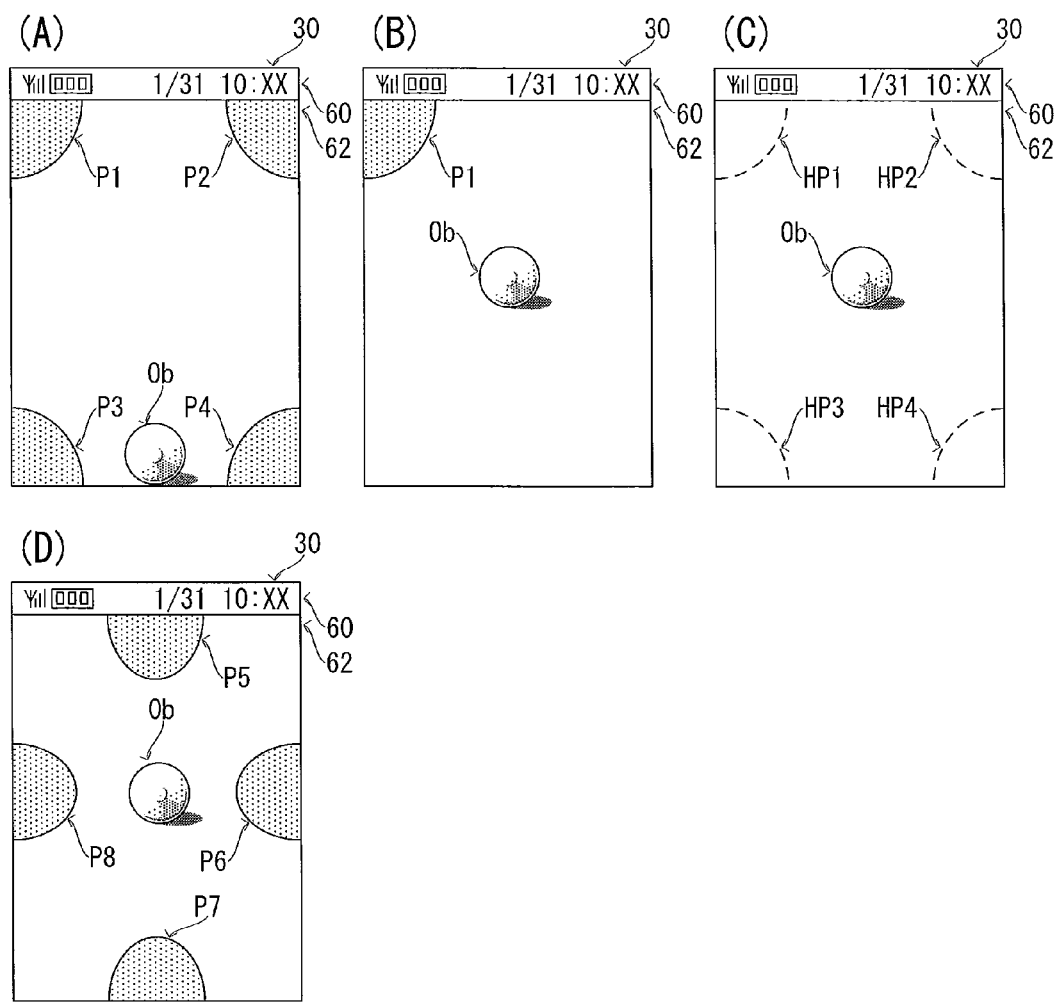
FIG. 6 is an illustrative view showing one example of a key locked screen displayed on a display shown in FIG. 1.

Additionally, as shown in FIG. 6(B), only one pocket object P1 may be displayed. Here, in a case of the lock screen in FIG. 6(B), the one pocket object P to be displayed may be the other pocket objects P2-P4 without being restricted to the pocket object P1. In addition, the number of pocket objects P to be displayed may be equal to or less than three, or be equal to or more than five. Then, the one pocket object P to be displayed may be different every time that the lock screen is displayed.

Also, as shown in FIG. 6(C), the pocket object P may be made invisible. In this case, in the predetermined area, hidden objects HP1-HP4 each of which is colorless and transparent or is the same in color as the background. In addition, in another embodiment, the hidden object HP may not be provided in the predetermined area.

Furthermore, as shown in FIG. 6(D), the pocket object P may be provided at each side. In another embodiment, for example, a pocket object P5 is provided at the top side, a pocket object P6 is provided at the right side, a pocket object P7 is provide at the bottom side, and a pocket object P8 is provided at the left side.

Moreover, the on-screen position of the moving object Ob and the display manner of the pocket object P as shown in FIG. 3(A) and FIG. 6(A) to FIG. 6(D) may arbitrarily be combined, and a concrete combination can easily be imaged, and therefore, a detailed description thereof is omitted.

<Second Embodiment>

In the second embodiment, when the on-screen position of the moving object Ob is included in two predetermined areas, it is determined that a predetermined relationship is established to cancel the key locked state. Here, in the second embodiment, the electric configuration and the appearance of the mobile phone apparatus 10 are the same as those in the first embodiment, and therefore, detailed description thereof are omitted.

Figure 7:
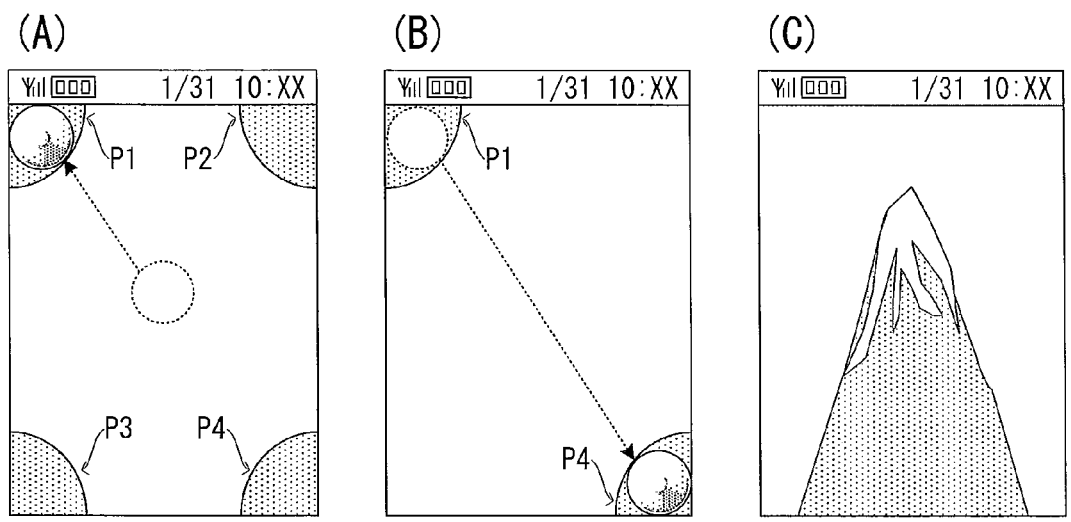
FIG. 7 is an illustrative view showing one example of a process of cancelling a key locked state of the second embodiment set to the mobile phone apparatus shown in FIG. 1.

Referring to FIG. 7(A), when the moving object Ob is put into the pocket object P1, the display of the pocket objects P2, P3 is erased as shown in FIG. 7(B). That is, only the pocket object P1 into which the moving object Ob is put and the pocket object P4 that is positioned diagonal to the pocket object P1 are displayed on the lock screen. Then, when the moving object Ob is moved from the pocket object P1 to the pocket object P4, the key locked state is cancelled, and a standby screen as shown in FIG. 7(C) is displayed on the display 30. That is, when the moving object Ob is put into the pocket object P1 (first predetermined area) and then put into the pocket object P4 (second predetermined area), it is determined that the moving object Ob and the plurality of predetermined areas establish the predetermined relationship to thereby cancel the key locked state of the mobile phone apparatus 10.

Thus, in the second embodiment, the key locked state is set to be cancelled only when the plurality of pocket objects P are utilized, and whereby, it is possible to reduce an operating error in cancellation of the key locked state. For example, when the mobile phone apparatus 10 in a bag undergoes a key operation contrary to the user's intention, the lock screen is displayed. At this time, when the mobile phone apparatus 10 moves with the bag, it is determined that the attitude of the mobile phone apparatus 10 is changed, to thereby move the display of the moving object Ob. As a result, it is conceivable that the moving object Ob enters the pocket object P to cause the key locked state to be erroneously cancelled. However, like the second embodiment, by setting the key locked state so as to be cancelled only when the plurality of pocket objects P are utilized, it is possible to reduce occurrence of the aforementioned operating error.

Moreover, by deciding an order of putting the on-screen position of the moving object Ob into the plurality of predetermined areas, an operating error in cancelling the key locked state can be further reduced. Here, in another embodiment, if the moving object Ob is put into the two pocket objects P that are arbitrarily selected in an arbitrary order, the key locked state may be cancelled.

Figure 8:
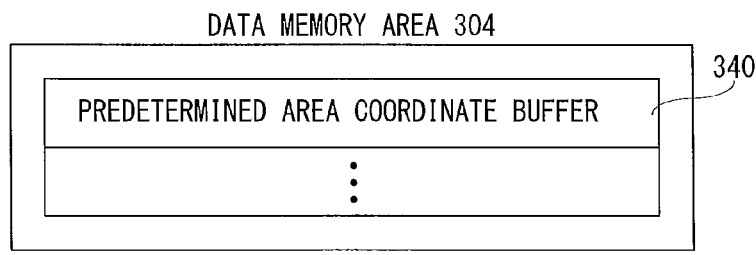
FIG. 8 is an illustrative view showing one example of a memory map of the second embodiment of the RAM shown in FIG. 1.

With reference to FIG. 8, in the RAM 34 of the second embodiment, in addition to the buffer shown in the memory map (FIG. 4) of the first embodiment, a predetermined area coordinate buffer 340 is further provided. In the predetermined area coordinate buffer 340, coordinate data indicating the second predetermined area is temporarily stored.

Figure 9:
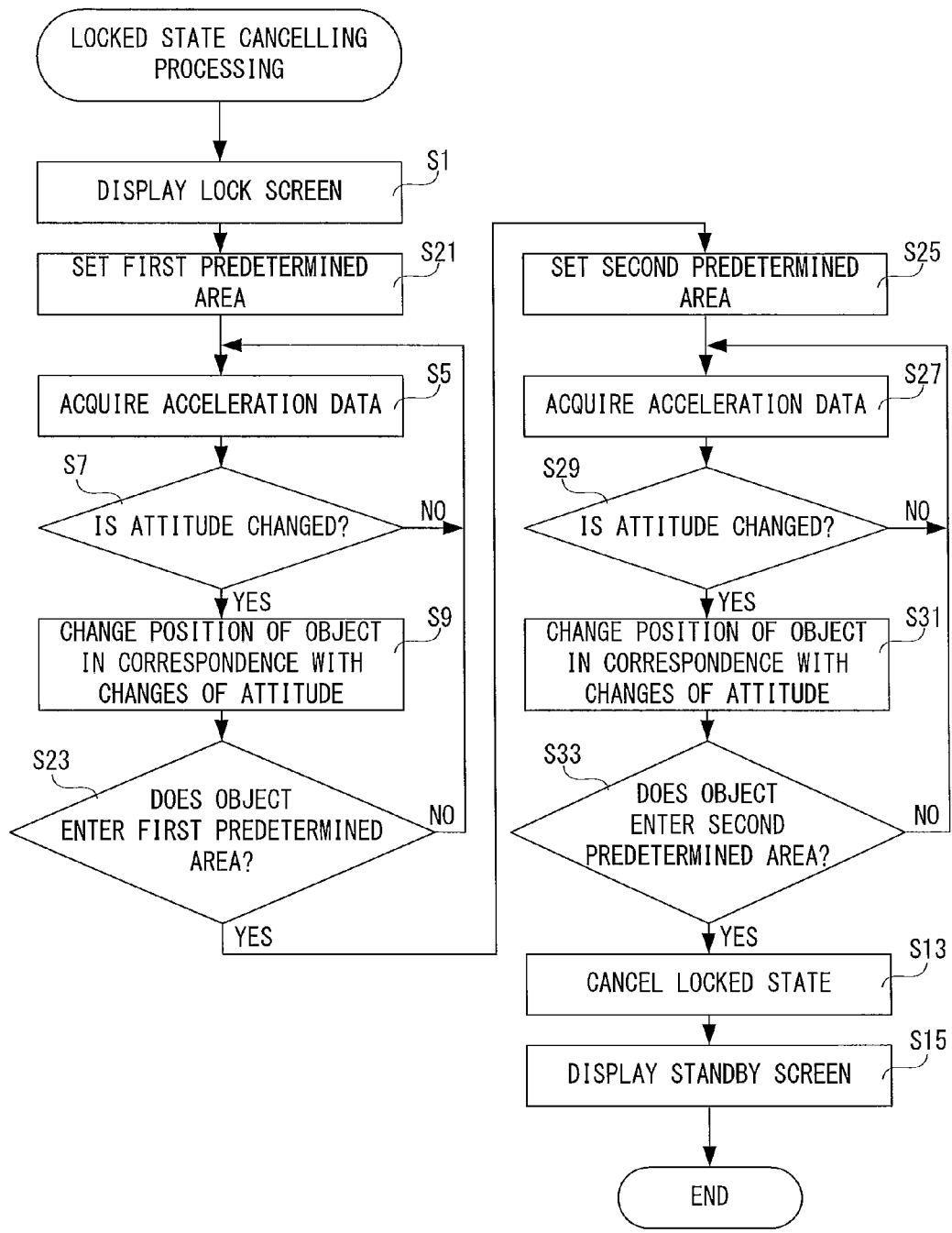
FIG. 9 is a flowchart showing one example of locked state cancelling processing of the second embodiment by the processor shown in FIG. 1.

In the second embodiment, locked state cancelling processing shown in FIG. 9 is executed. Here, in the locked state cancelling processing of the second embodiment, each processing the same as the first embodiment is given the same step number as that in the locked state cancelling processing shown in FIG. 5. Also, a detailed description as to the processing that has already been explained is omitted.

For example, when a key operation is performed on the mobile phone apparatus 10 to which the key locked state is set, the processor 24 displays the lock screen in a step S1. Succeedingly, in a step S21, first predetermined areas are set. That is, the coordinates indicated by the predetermined area coordinate data 338 are set as the first predetermined areas on the lock screen in order to make the user select a first pocket object P, and the pocket objects P1-P4 are displayed on the display 30 so as to be lined with the plurality of first predetermined areas.

Then, in a step S5, acceleration data is acquired, and in a step S7, it is determined whether or not the attitude is changed. If "NO" in the step S7, the process returns to the step S5. On the other hand, if "YES" in the step S7, that is, if the attitude of the mobile phone apparatus 10 is changed, the on-screen position of the moving object Ob is moved in correspondence with the changes of the attitude in a step S9.

Succeedingly, in a step S23, it is determined whether or not the moving object Ob enters the first predetermined area. For example, similar to the step S11, the on-screen position of the moving object Ob that is temporarily stored in the object coordinate buffer 332 is included in the area coordinates indicated by the predetermined area coordinate data 338. If "NO" in the step S23, that is, if the moving object Ob does not enter the pocket object P, the process returns to the step S5.

On the other hand, if "YES" in the step S23, that is, if the moving object Ob enters the pocket object P1 as shown in FIG. 7(A), a second predetermined area is set in a step S25. For example, the first predetermined area represented by the pocket object P4 positioned diagonal to the pocket object P1 which the moving object Ob enters is set as a second predetermined area. Furthermore, the coordinate data set as a second predetermined area is stored in the predetermined area coordinate buffer 340.

Succeedingly, in a step S27, acceleration data is acquired similar to the step S5. Then, in a step S29, it is determined whether or not the attitude is changed. If "NO" in the step S29, the process returns to the step S27. On the other hand, if "YES" in the step S29, that is, if the attitude of the mobile phone apparatus 10 is changed, the position of the moving object Ob is changed in correspondence with the changes of the attitude in a step S31.

Then, in a step S33, it is determined whether or not the object enters the second predetermined area. That is, it is determined whether or not the on-screen position of the moving object Ob that is temporarily stored in the object coordinate buffer 332 is included in the area coordinates included in the predetermined area coordinate buffer 340. If "NO" in the step S33, that is, if the moving object Ob does not enter the pocket object P represented by the second predetermined area, the process returns to the step S27. On the other hand, if "YES" in the step S33, that is, if the moving object Ob enters the pocket object P4 represented by the second predetermined area as shown in FIG. 7(B), for example, the key locked state is cancelled in a step S13, and a standby screen is displayed in a step S15. Then, after completion of the processing in the step S15, the locked state cancelling processing of the second embodiment is ended.

By executing such processing, in the second embodiment, it is possible to reduce an operating error in the cancel operation of the key locked state.

In another embodiment, an order of moving the moving object Ob may be decided in advance. For example, in a case that the mobile phone apparatus 10 is operated such that the moving object Ob is simply put into the pocket object P, someone other than the owner of the mobile phone apparatus 10 can perform the operation. That is, anyone can cancel the key locked state of the mobile phone apparatus 10. However, in a case that an order of moving the moving object Ob is decided in advance, only the person who knows the order can cancel the key locked state of the mobile phone apparatus 10. That is, a third party who does not know the order cannot cancel the key locked state of the mobile phone apparatus 10. Accordingly, by deciding in advance the order of moving the moving object Ob, it is possible to increase security of the key locked state.

In still another embodiment, the pocket object P in to which the moving object Ob is first put may be any one of the pocket objects P2 to P4. In a further embodiment, the number of a pocket objects P to be utilized when the user cancels the key locked state may be three or more without being restricted two. In another embodiment, the second predetermined area may be a position that faces to face with the first predetermine area horizontally and vertically without being restricted to the orthogonal position.

<Third Embodiment>

Figure 10:
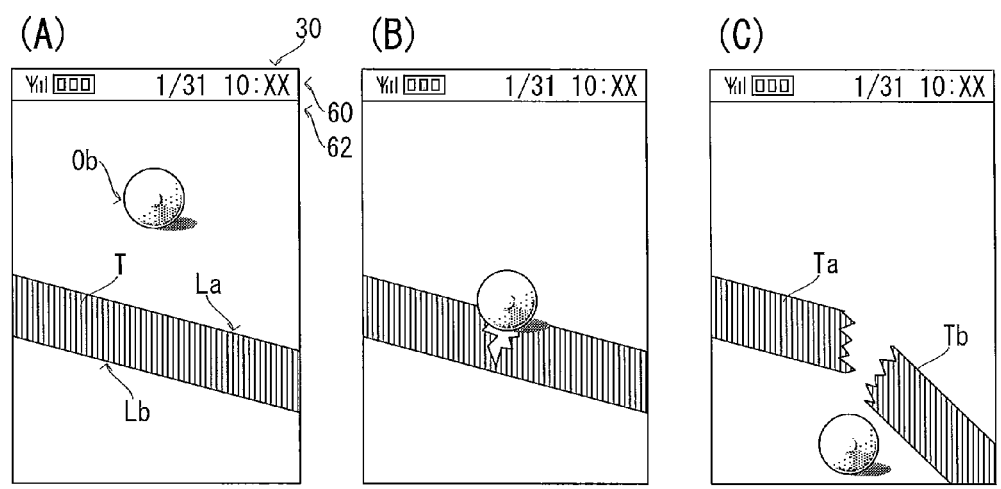
FIG. 10 is an illustrative view showing one example of a process of cancelling a key locked state of the third embodiment set to the mobile phone apparatus shown in FIG. 1.

On a lock screen of the third embodiment, a line object T is displayed in place of the pocket object P as shown in FIG. 10(A). Then, when the moving object Ob crosses the line object T, it is determined that the predetermined relationship is established to thereby cancel the key locked state. Here, in the third embodiment, an electric configuration and an appearance of the mobile phone apparatus 10 are the same as those in the first embodiment, and therefore, a detailed description thereof is omitted.

With reference to FIG. 10(A), on the lock screen of the third embodiment, the moving object Ob is displayed in approximately the upward center, and the line object T is provided in a lateral direction of the lock screen. Furthermore, the border between the line object T and the background is represented by an upper boarder line La and a lower boarder line Lb.

Next, when the attitude of the mobile phone apparatus 10 changes to make the moving object Ob move and hit the line object T, the line object T is cracked (crevice) as shown in FIG. 10(B). When the moving object Ob further moves to completely cross the line object T, the line object T is divided into a first line object Ta and a second line object Tb. Thereafter, the key locked state set to the mobile phone apparatus 10 is cancelled.

Thus, by merely moving the moving object O so as to cross the line object T, the user can easily cancel the key locked state.

Here, processing of determining whether or not the moving object Ob crosses the line object T is explained. The two boundary lines of the line object T are indicated by the upper boarder line La and the lower boarder line Lb. Then, the two boundary lines can be represented by simple equations. Thus, if the coordinates indicating the on-screen position of the moving object Ob satisfy the equations indicating the upper boarder line La and the lower boarder line Lb, it is determined that the moving object Ob crosses the line object T.

Furthermore, it is conceivable that the mobile phone apparatus 10 may not be in a horizontal position when the lock screen is displayed. In this case, the attitude of the mobile phone apparatus 10 is tilted, and thus, as soon as the lock screen is displayed, the moving object Ob moves downward to thereby cross the line object T. That is, as soon as the lock screen is displayed, the key locked state is cancelled immediately contrary to the user's intention. Thereupon, in the third embodiment, when the locked state cancelling processing is executed, attitude correction processing for correcting the attitude of the mobile phone apparatus 10 is performed, to thereby prevent the moving object Ob from moving freely. As concrete processing, when the lock screen is displayed, acceleration data of three axes that is stored in the acceleration buffer 330 is temporarily stored. Then, the processor 24 subtracts the acceleration data of three axes that is temporarily stored from the acceleration data stored in the acceleration buffer 330. Thus, the processor 24 recognizes that the attitude of the mobile phone apparatus 10 when the lock screen is displayed is in the horizontal position, and thus, the moving object Ob never moves freely. Here, when the locked state cancelling processing is ended, the acceleration data of three axes that is temporarily stored is erased, and therefore, the correction of the attitude is cancelled at the same time with the end of the locked state cancelling processing.

In another embodiment, the aforementioned problem may be solved without performing the attitude correction processing. For example, the line object T may be displayed above the moving object Ob. In addition, in a still another embodiment, unless the attitude of the mobile phone apparatus 10 is made horizontal, the moving object Ob may not be moved. In this case, character strings, sound, design, etc. for prompting the user to make the attitude of the mobile phone apparatus 10 horizontal may be notified.

Figure 11:
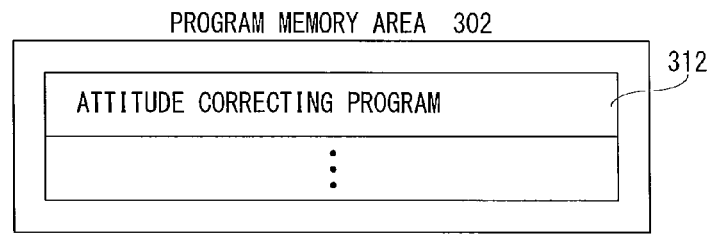
FIG. 11 is an illustrative view showing one example of a memory map of the third embodiment of the RAM shown in FIG. 1.

With reference to FIG. 11, in the RAM 34 of the third embodiment, in addition to the program shown in the memory map (FIG. 4) of the first embodiment, an attitude correcting program 312 is further stored. The attitude correcting program 312 is a program for making correction regarding the attitude of the mobile phone apparatus 10 as a horizontal position.

Figure 12:
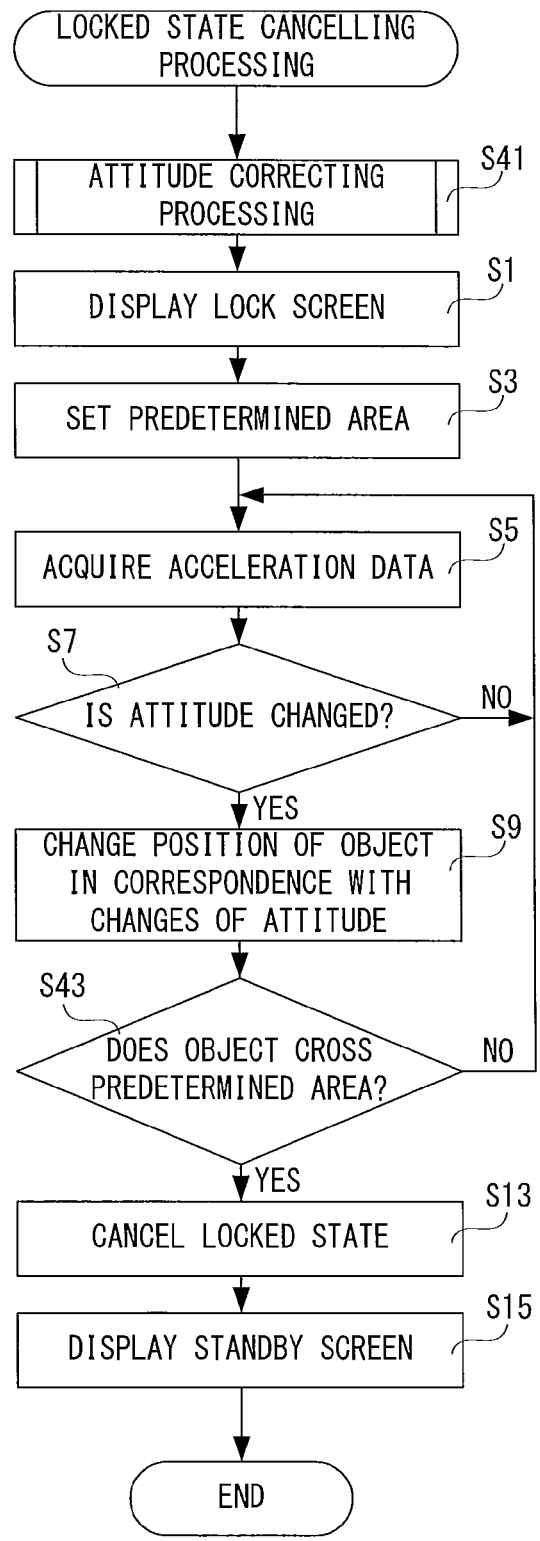
FIG. 12 is a flowchart showing one example of locked state cancelling processing of the third embodiment by the processor shown in FIG. 1.

In the third embodiment, the locked state cancelling processing shown in FIG. 12 is executed. Here, in the locked state cancelling processing of the third embodiment, each processing the same as the first embodiment is given the same step number as that in the locked state cancelling processing shown in FIG. 5. Also, a detailed description as to the processing that has already been explained is omitted.

For example, when a key operation is performed in the mobile phone apparatus 10 to which a key locked state is set, the processor 24 executes attitude correction processing in a step S41. That is, as described above, when the processing in the step S41 is executed, the attitude of the mobile phone apparatus 10 is corrected on the basis of the acceleration data stored in the acceleration buffer 330.

Succeedingly, in a step S1, a lock screen is displayed, and in a step S3, a predetermined area is set. That is, when the processing in the steps S1 and S3 is executed, the lock screen as shown in FIG. 10(A) is displayed. Succeedingly, in a step S5, acceleration data is acquired, and in a step S7, it is determined whether or not the attitude is changed. If "NO" in the step S7, the process returns to the step S5. On the other hand, if "YES" in the step S7, that is, if the attitude of the mobile phone apparatus 10 is changed, the position of the moving object Ob is changed in correspondence with the changes of the attitude in a step S9.

Then, in a step S43, it is determined whether or not the moving object Ob crosses the predetermined area. That is, it is determined whether or not the coordinates indicating the on-screen position of the moving object Ob satisfy the two equations which represent the two boundary lines of the line object T. If "NO" in the step S43, that is, if the moving object Ob does not cross the line object T, the process returns to the step S5. On the other hand, if "YES" in the step S43, that is, if the moving object Ob crosses the predetermined area represented by the line object T, the key locked state is cancelled in a step S13, and the standby screen is displayed in a step S15. Then, after completion of the processing in the step S15, the acceleration data for correction that is temporarily stored in the processing in the step S41 is erased, and the locked state cancelling processing of the third embodiment is ended.

By executing such processing, in the third embodiment, the user can easily cancel the key locked state by moving the moving object Ob so as to cross the line object T.

Here, when the line object T is divided into two, the line object T may be operated as if a tape is torn, or as if a plate is broken. At this time, the moving object Ob may take shape of blade products, such as a pair of scissors, a saw, etc. Or, even if the moving object Ob crosses the line object T, the key locked state may be cancelled without division of the tape object T.

<Fourth Embodiment>

In a fourth embodiment, when a moving path M of the moving object Ob is included in a predetermined area A, it is determined that a predetermined relationship is established to thereby cancel the key locked state. Here, the fourth embodiment is the same as the first embodiment in the electric configuration and the appearance of the mobile phone apparatus 10, and therefore, detailed description thereof is omitted.

Figure 13:
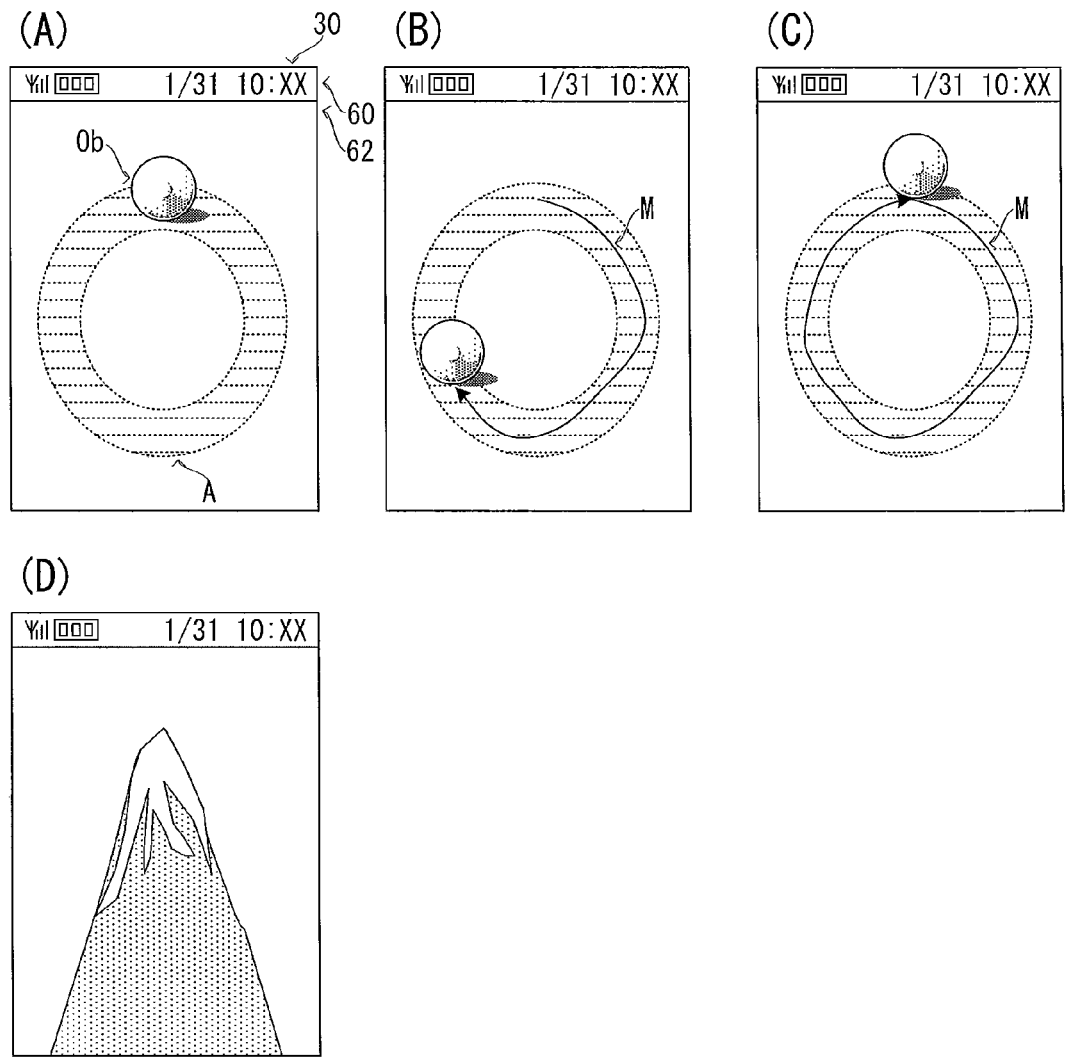
FIG. 13 is an illustrative view showing one example of a process of cancelling a key locked state of the fourth embodiment set to the mobile phone apparatus shown in FIG. 1.

With reference to FIG. 13(A), on the lock screen of the fourth embodiment, a predetermined area A that is invisible to the user is provided in approximately the center of the lock screen, and within the predetermined area A, the moving object Ob is arranged. Furthermore, the shape of the predetermined area A is oval, but the center is hollow and not the predetermined area A.

Additionally, with reference to FIG. 13(B), when the attitude of the mobile phone apparatus 10 is changed, the moving object Ob moves, and a moving path M is depicted following its movement. In addition, when the moving path M is depicted, and the decision key included in the key input device 26 is operated, depiction of the moving path M is ended. At this time, if the start point and the end point of the moving path M are positioned at approximately the same position, the processor 24 determines that the design is depicted by the moving path M. Then, when the design represented by the moving path M in FIG. 13(C) is included in the predetermined area A, the key locked state is cancelled to thereby display a standby screen shown in FIG. 13(D).

Thus, in the fourth embodiment, by drawing a design of a predetermined shape by the moving object Ob, it is possible to cancel the key locked state. In addition, the design to be depicted in the predetermined area A is decided in advance, and this makes it difficult for a third party who does not know the design for cancellation to cancel the key locked state. That is, it is possible to increase security of the key locked state.

Here, in the key locked state cancelling processing of the fourth embodiment, in a case that the distance between the starting point and the end point is equal to or less than a threshold value, it is determined that the starting point and the end point are positioned at approximately the same position. Furthermore, in the fourth embodiment as well, in order to prevent the moving path M which is not intended by the user from being depicted, the attitude correction processing is executed similar to the third embodiment.

Figure 14:
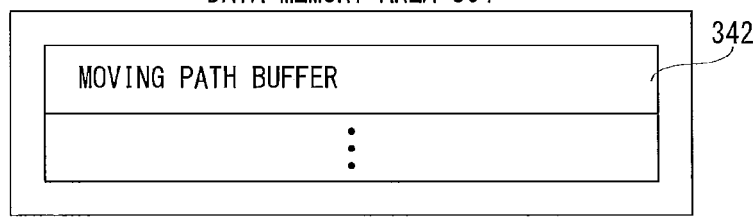
FIG. 14 is an illustrative view showing one example of a memory map of the fourth embodiment of the RAM shown in FIG. 1.

With reference to FIG. 14, in the RAM 34 of the fourth embodiment, a moving path buffer 342 is further provided to the data memory area 304 in the memory map (FIG. 4) of the first embodiment. In the moving path buffer 342, coordinate data corresponding to the moving path M shown in FIG. 13(B), FIG. 13(C), for example, is temporarily stored. Here, although illustration is omitted, in the RAM 34 of the fourth embodiment, the attitude correcting program 312 is stored.

Figure 15:
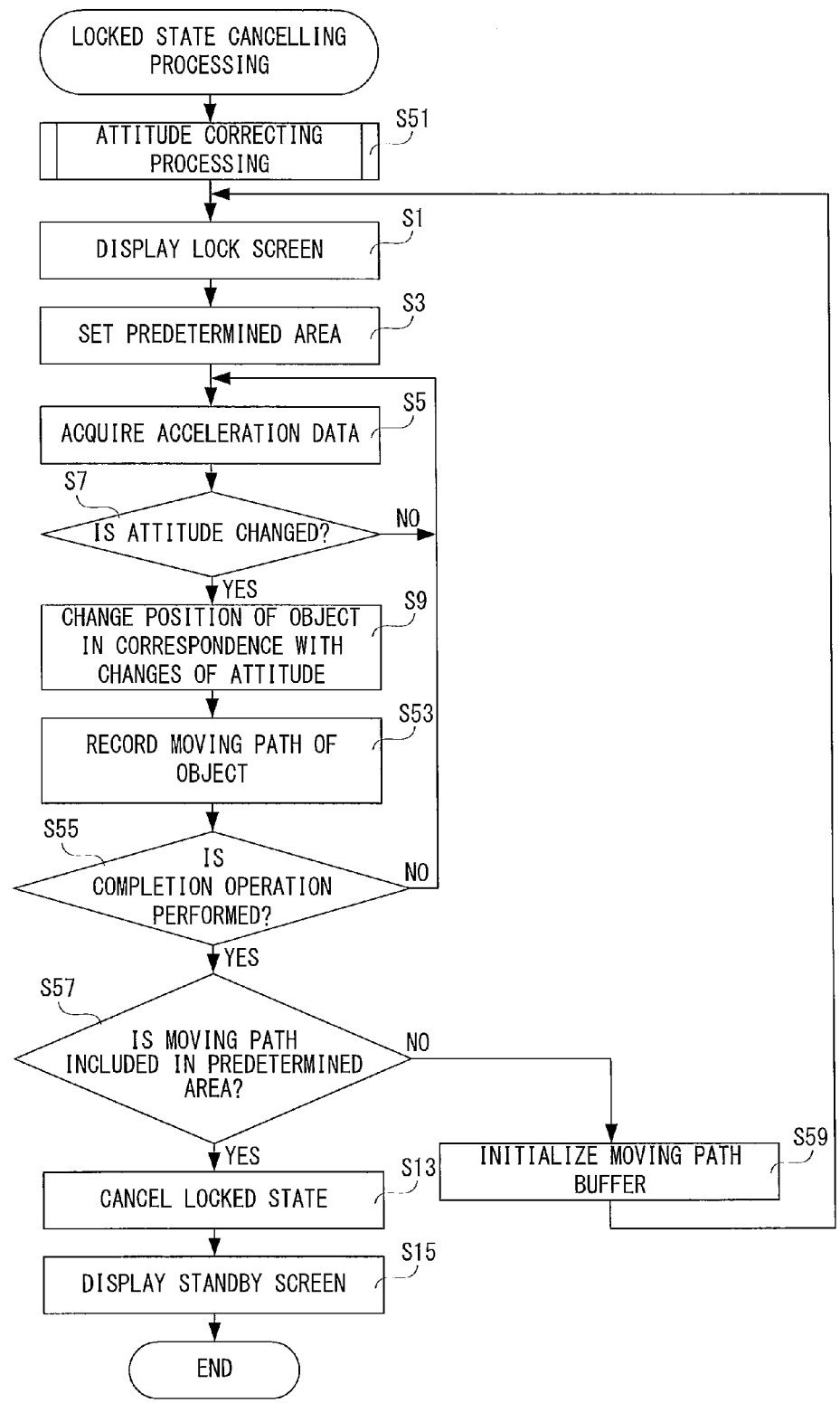
FIG. 15 is a flowchart showing one example of locked state cancelling processing of the fourth embodiment by the processor shown in FIG. 1.

In the fourth embodiment, locked state cancelling processing shown in FIG. 15 is executed. Here, in the locked state cancelling processing of the fourth embodiment, each of the processing the same as the first embodiment is given the same step number as that in the locked state cancelling processing shown in FIG. 5. Also, a detailed description as to the processing that has already been explained is omitted.

For example, when a key operation is performed on the mobile phone apparatus 10 to which a key locked state is set, the processor 24 executes attitude correction processing in a step S51. Succeedingly, in a step S1, a lock screen is displayed, and in a step S3, a predetermined area A is set. That is, when the processing in the steps S1, S3 is executed, the lock screen shown in FIG. 13(A) is displayed on the display 30.

Then, in a step S5, acceleration data is acquired, and in a step S7, it is determined whether or not the attitude is changed. If "NO" in the step S7, the process returns to the processing in the step S5. On the other hand, if "YES" in the step S7, that is, if the attitude of the mobile phone apparatus 10 is changed, the position of the moving object Ob is changed in correspondence with changes of the attitude in a step S9.

Succeedingly, in a step S53, the moving path M of the moving object Ob is recorded. That is, coordinates indicating the on-screen position of the moving object Ob that are changed by the processing in the step S9 are stored in the moving path buffer 342.

Then, in a step S55, it is determined whether or not a completion operation is performed. That is, it is determined whether or not the user operates the decision key in order to end the operation of depicting the design by the moving path M. If "NO" in the step S55, that is, if the decision key is not operated, the process returns to the step S5. On the other hand, if "YES" in the step S55, that is, if the decision key is operated, it is determined whether or not the moving path M is included in the predetermined area A in a step S57. That is, it is determined whether or not the coordinate data stored in the moving path buffer 342 is entirely included in the coordinate range indicated by the predetermined area coordinate data 338.

If "NO" in the step S57, that is, if the moving path M is not included in the predetermined area A, the moving path buffer 332 is initialized in a step S59, and the process returns to the step S1. That is, the user is requested to depict the moving path M again.

On the other hand, if "YES" in the step S57, that is, if the moving path M is included in the predetermined area A, the key locked state is cancelled in a step S13, and a standby screen is displayed in a step S15. Then, after completion of the processing in the step S15, the locked state cancelling processing of the fourth embodiment is ended. Here, if the number of determinations of "NO" in the processing of the step S57 is above predetermined number of times, the locked state cancelling processing may be ended without canceling the key locked state.

By executing such processing, in the fourth embodiment, it is possible to cancel the key locked state by depicting a design of a predetermined shape.

Additionally, in FIG. 13(B) and FIG. 13(C), a moving direction of the moving object Ob is clockwise, but may be counterclockwise. That is, in the fourth embodiment, the moving direction of the moving object Ob is independent of cancellation of the key locked state. Here, in another embodiment, the moving direction of the moving object Ob may also be included in a cancellation condition of the key locked state.

Also, the shape of the moving path M for cancellation of the key locked state may be a polygon such as a triangle, a quadrangle, etc. without being restricted to a circle. In this case, the user can arbitrarily select from these designs. In addition, the user can arbitrarily register the design for cancellation of the key locked state.

In another embodiment, the predetermined area A is made visible to the user to thereby make it easy for the user to perform depiction by the moving object Ob. In this case, the on-screen position of the moving object Ob may not be included in the predetermined area A in the initial state.

In still another embodiment, only during a period of the key included in the key input device 26 being pushed, the moving path of the moving object Ob may be recorded. When the key is released, this is determined as a completion operation.

In a further embodiment, only when the moving object Ob is changed in color or is blinking, the moving path M can be depicted. In this case, the user is not required to perform the completion operation. In another embodiment, the moving object Ob may take shape of a pencil, a ballpoint pen, or the like.

<Fifth Embodiment>

In a fifth embodiment, an estimated moving velocity of the moving object Ob is previously calculated, and if the calculated estimated moving velocity is not equal to or more than a threshold value, the moving object Ob is not moved. Thus, if the estimated moving velocity is not equal to or more than the threshold value, the processor 24 does not determine whether or not the moving object Ob and the predetermined area have a predetermined relationship.

Here, the threshold value of the fifth embodiment is a value smaller than the estimated moving velocity which is calculated when the user intentionally changes the attitude of the mobile phone apparatus 10. Thus, if the user does not intentionally change the attitude of the mobile phone apparatus 10, the key locked state is not cancelled. Thus, it is possible to further reduce an operating error in the key locked state.

It should be noted that when a predetermined time (5 sec., for example) has elapsed with the estimated moving velocity of the moving object Ob being less than the threshold value, the display of the display 30 is erased, and the key locked state is not cancelled.

Additionally, the fifth embodiment is the same as the first embodiment in the electric configuration, etc. of the mobile phone apparatus 10, and therefore, detailed description thereof is omitted. Furthermore, the lock screen is the same as that of the first embodiment, and thus, a detailed description thereof is omitted.

Figure 16:
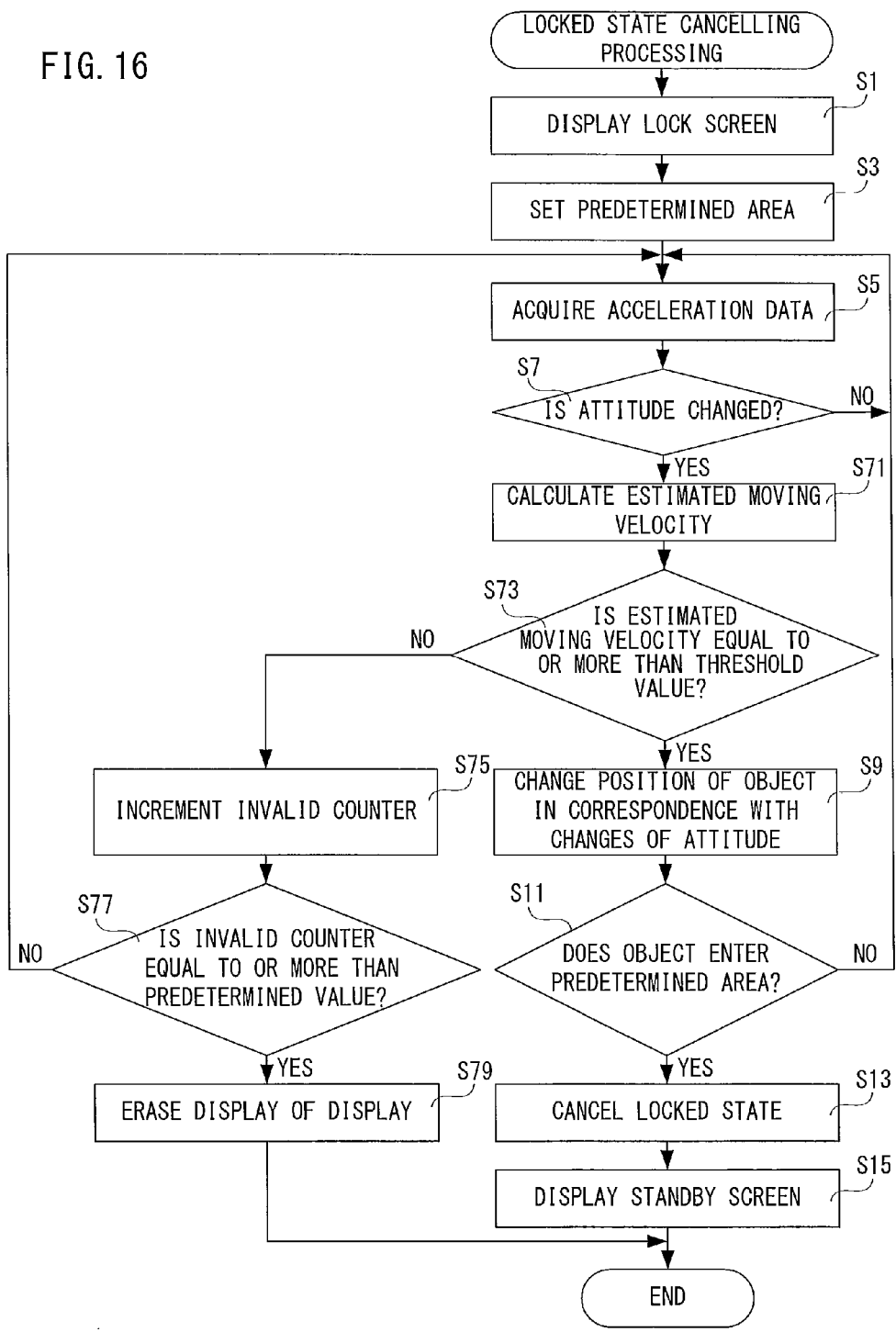
FIG. 16 is a flowchart showing one example of locked state cancelling processing of the fifth embodiment by the processor shown in FIG. 1.

In the fifth embodiment, locked state cancelling processing as shown in FIG. 16 is executed. Here, in the locked state cancelling processing of the fifth embodiment, each of processing the same as the first embodiment is given the same step number as that in the locked state cancelling processing shown in FIG. 5. Also, a detailed description as to the processing that has already been explained is omitted.

For example, if a key operation is performed on the mobile phone apparatus 10 to which a key locked state is set, the processor 24 displays a lock screen in a step S1, and sets a predetermined area in a step S3. That is, on the display 30, the lock screen shown in FIG. 3(A) is displayed. Succeedingly, in a step S5, acceleration data is acquired, and in a step S7, it is determined whether or not the attitude is changed. If "NO" in the step S7, that is, if the attitude is not changed, the process returns to the step S5.

Alternatively, if "YES" in the step S7, that is, if the attitude of the mobile phone apparatus 10 is changed, the estimated moving velocity is calculated in a step S71. More specifically, the distance between the coordinates through which the on-screen position of the moving object Ob moves is calculated based on an amount of change of the acceleration data for each frame. Then, the calculated distance between the coordinates is divided by a frame updating cycle (1/30 ms.) to thereby evaluate the estimated moving velocity of the moving object Ob for each frame.

Succeedingly, in a step S73, it is determined whether or not the estimated moving velocity is equal to or more than the threshold value. If "YES" in the step S73, that is, if the estimated moving velocity calculated in the step S71 is equal to or more than the threshold value, processing after the step S9 is executed.

Furthermore, if "NO" in the step S73, that is, if the estimated moving velocity is less than the threshold value, the invalid counter is incremented in a step S75. For example, the invalid counter is utilized for counting a time during which the calculated estimated moving velocity is less than the threshold value. Then, in the step S75, such an invalid counter is incremented. Succeedingly, in a step S77, it is determined whether or not the invalid counter is equal to or more than a predetermined value. That is, in the processing of the step S77, the time calculated based on the invalid counter is equal to or more than the predetermined time.

If "NO" in the step S77, that is, if the predetermined time has not elapsed with the estimated moving velocity being less than the threshold value, the process returns to the step S5 to calculate the estimated moving velocity again. On the other hand, if "YES" in the step S77, that is, if the predetermined time has elapsed, the display of the display 30 is erased in a step S79. For example, the processor 24 turns the power of the display 30 off. After completion of the processing in the step S79, the locked state cancelling processing is ended. That is, when the predetermined time has elapsed with the estimated moving velocity being smaller than the threshold value, the display of the display 30 is erased without cancellation of the key locked state.

Here, the fifth embodiment is described by adding the estimated moving velocity calculating processing to the first embodiment (one pocket object P), but the estimated moving velocity calculating processing may be added to the second embodiment (two pocket objects) and the third embodiment (line object T).

In another embodiment, if the calculated velocity is not less than the threshold value, the moving object Ob may not be moved.

As understood from the above descriptions, the mobile phone apparatus 10 has an accelerometer 36 for detecting an attitude and a display 30 for displaying the moving object Ob, etc. Furthermore, the key locked state is set to the mobile phone apparatus 10 in order to reduce an operating error of the key. When an arbitrary key is operated during the key locked state, the moving object Ob, the pocket object P representing the predetermined area, etc. are displayed on the display 30. Then, when in correspondence with the change of the attitude of the mobile phone apparatus 10, the moving object Ob changes, and has a predetermined relationship with the predetermined area, the key locked state is cancelled.

Thus, the user can know the result of an operation for cancelling the key locked state by the moving object Ob. Thus, the user can easily perform a cancelling operation of the key locked state.

It should be noted that the first to fifth embodiments and other embodiments according to each of the first to fifth embodiments can be arbitrarily combined with each other, and the concrete combinations can be easily imagined, and thus, the detail description thereof is omitted.

Furthermore, in the present embodiment, when a predetermined time has elapsed without any operation, a transition to the key locked state is made, but in another embodiment, the predetermined time may be made shorter. That is, if the predetermined time before a transition to the key locked state is made short, even if the key locked state is erroneously cancelled in the bag, an erroneous input is less likely to occur.

In another embodiment, by inputting a personal identification number, the key locked state may be cancelled. In this case, when a key operation is performed on the decision key, etc. during the key locked state, a personal identification number lock screen for inputting a personal identification number is displayed on the display 30 in place of the lock screen shown in FIG. 3(A). In still another embodiment, every time that the decision key is operated, the lock screen and the personal identification number lock screen may be switched. In a further embodiment, if the mobile phone apparatus 10 is provided with a touch panel, every time that a touch is performed on the object Ob, the lock screen and the personal identification number lock screen may be switched.

In another embodiment, when the key locked state is cancelled, not the standby screen but the personal identification number lock screen may be displayed. That is, in this embodiment, a key lock function and a personal identification number lock may be combined. Thus, by utilizing the object Ob, it is possible to reduce an operating error with respect to the key input device 26 and by utilizing the personal identification number, it is possible to reduce unauthorized use by the third party.

Furthermore, in accordance with a movement of the moving object Ob, a sound like rolling of a ball is output, and an animation in which the moving object Ob itself is rolling is displayed, whereby, a realistic movement of the moving object Ob may be represented. In addition, a physical operation is added to the movement of the moving object Ob to thereby move the moving object Ob with reality. In this case, when the moving object Ob hits the periphery of the lock screen, the ball moves as if it bounces off the periphery.

In another embodiment, by using a magnetic sensor, the attitude of the mobile phone apparatus 10 can be detected more accurately. In still another embodiment, the attitude of the mobile phone apparatus 10 may be detected by means of a gyro sensor in place of the accelerometer.

Furthermore, the communication system of the mobile phone apparatus 10 is the CDMA system, but an LTE (Long Term Evolution) system, a W-CDMA system, a GSM system, a TDMA system, an FDMA system and a PHS system may be adopted.

Moreover, the locked state cancelling program 310, etc. used in the present embodiment may be stored in an HDD of a server for data delivery, and delivered to the mobile phone apparatus 10 via a network. Also, the locked state cancelling program 310 is stored in a recording medium like an optical disk, such as CD, DVD, BD (Blue-ray Disc), etc., a USB memory, a memory card, or the like, and the recording medium with it stored may be sold or distributed. Then, in a case that the locked state cancelling program 310 downloaded from the aforementioned server and recording medium is installed onto a mobile phone apparatus having a similar configuration to the present embodiment, an effect similar to the present embodiment can be obtained.

In addition, the present embodiment may be applied to smart phones and PDAs (Personal Digital Assistant) without being restricted to only mobile phone apparatuses 10.

It should be noted that all the concrete numerical values of the predetermined time, etc. depicted in the specification are all simple examples, and are changeable as necessary depending on the specification of the product.

A mobile terminal (10: reference numeral illustrating a corresponding part in this embodiment. This holds true hereunder.) has a detector (36) to detect its own attitude by accelerations, etc. and a displayer (30) to display a moving object (Ob) on the screen. For example, when an operation of setting the locked state is performed, the mobile terminal is locked to prevent the key of the mobile terminal from being accidentally operated. A setter (24, S3) sets a predetermined area (P, HP, T, A) in a corner, etc. of the screen. A changer (24, S9) changes an on-screen position of the moving object in correspondence with the changes of the attitude of the mobile terminal. A determiner (24, S11, S23, S33) determines whether or not a predetermined relationship is established based on a condition that the moving object enters or crosses the predetermined area. A canceller (24, S13) can cancel the locked state set to the mobile terminal when it is determined that the aforementioned predetermined relationship has established.

According to the first aspect, a user can know a result of an operation for cancelling the locked state by the moving object. Thus, the user can easily perform an appropriate operation for cancelling the locked state.

The determiner may determine that the moving object and the predetermined area have the predetermined relationship when the on-screen position of the moving object enters the predetermined area.

According to the mobile terminal, the user can cancel the locked state by a simple operation of putting the moving object into the predetermined area.

Furthermore, in a case that an object for cancellation is displayed so as to be lined with the predetermined area, it is possible to prompt the user to cancel the key locked state without using the languages.

The setter may include a first setter which sets a first predetermined area and a second setter which sets a second predetermined area, and the determiner may determine that the moving object and the predetermined area have the predetermined relationship when the on-screen position of the moving object enters the first predetermined area and the second predetermined area.

In the mobile terminal, with respect to a display area displayed by a displayer, a first setter (24, S21) sets a first predetermined area, and a second setter (24, S25) sets a second predetermined area. When the on-screen position of the moving object enters the first predetermined area and the second predetermined area, the locked state is cancelled.

According to the mobile terminal, only when a plurality of predetermined areas are utilized, the locked state is canceled to thereby reduce an operating error in cancellation of the locked state.

The second setter may set the second predetermined area when the on-screen position of the moving object enters the first predetermined area.

According to the mobile terminal, an order of putting the on-screen position of the moving object into the plurality of predetermined areas is decided, and therefore, it is possible to further reduce an operating error in cancellation of the locked state.

The determiner may determine that the moving object and the predetermined area have the predetermined relationship when the moving object crosses the predetermined area.

According to the mobile terminal, merely by moving the moving object so as to cross the predetermined area, the user can easily cancel the locked state.

The mobile terminal may further comprise a calculator which calculates a moving velocity of the moving object when the on-screen position of the moving object changes, wherein the determiner may determine whether or not the moving object and the predetermined area have a predetermined relationship when the moving velocity calculated by the calculator is equal to or more than a predetermined value.

In the mobile terminal, a calculator (24, S71) calculates a moving velocity of the moving object on the basis of the coordinates changing every frame and an updating cycle of the frame. The determiner does not determine whether or not the moving object and the predetermined area have a predetermined relationship if the moving velocity of the moving object is not equal to or more than the predetermined value.

According to the mobile terminal, the locked state can be set so as not to be cancelled without an intentional change of the attitude of the mobile terminal by the user. Thus, it is possible to further reduce an operating error in cancelling the locked state.

The mobile terminal may further comprises a recorder which records a moving path when the on-screen position of the moving object is changed by the changer, wherein the determiner may determine that the on-screen position of the moving object and the predetermined area have the predetermined relationship when the moving path recorded by the recorder is included the predetermined area.

In the mobile terminal, a recorder (24, S53) records coordinates indicating the on-screen position of the moving object as a moving path (M). Furthermore, the predetermined area takes a predetermined shape. Then, when the recorded moving path is included in the predetermined area of the predetermined shape, it is determined that the on-screen position of the moving object and the predetermined area have a predetermined relationship.

According to the mobile terminal, by deciding the design depicted in the predetermined area in advance, it is possible to prevent the third party who does not know the shape from cancelling the locked state. That is, it is possible to increase security of the locked state.

The second aspect of the invention is a locked state cancelling method of a mobile terminal (10) capable of setting a locked state and having a detector (36) to detect an attitude and a displayer (30) to display a moving object (Ob) on a screen, comprising: setting a predetermined area on the screen (S3); changing an on-screen position of the moving object on the basis of changes of the attitude detected by the detector (S9); determining whether or not the on-screen position of the moving object and the predetermined area have a predetermined relationship (S11, S23, S33); and cancelling the locked state when the determiner determines that the on-screen position of the moving object and the predetermined area have the predetermined relationship (S13).

In the second aspect as well, similar to the first invention, a user can know a result of an operation of cancelling the locked state by the moving object. Thus, the user can easily perform an appropriate operation for cancelling the locked state.

It should be noted that reference numerals and the supplements inside the parentheses show one example of a corresponding relationship with the embodiments described later for easy understanding of the present invention, and do not limit the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A mobile terminal capable of setting a locked state and having a detector to detect an attitude and a displayer to display a moving object on a screen, the mobile terminal comprising:
    a setter which sets a predetermined area on said screen;
    a changer which changes an on-screen position of said moving object on the basis of changes of the attitude detected by said detector, wherein the on-screen position of said moving object represents a center of gravity of the moving object;
    a determiner which determines whether or not said on-screen position of said moving object and said predetermined area have a predetermined relationship; and
    a canceller which cancels the locked state when said determiner determines that said on-screen position of said moving object and said predetermined area have said predetermined relationship.

2. A mobile terminal according to claim 1, wherein said determiner determines that said moving object and said predetermined area have said predetermined relationship when said on-screen position of said moving object enters said predetermined area.

3. A mobile terminal according to claim 2, wherein said setter includes a first setter which sets a first predetermined area and a second setter which sets a second predetermined area, and said determiner determines that said moving object and said predetermined area have said predetermined relationship when said on-screen position of said moving object enters said first predetermined area and said second predetermined area.

4. A mobile terminal according to claim 3, wherein said second setter sets said second predetermined area when said on-screen position of said moving object enters said first predetermined area.

5. A mobile terminal according to claim 1, wherein said determiner determines that said moving object and said predetermined area have said predetermined relationship when said moving object crosses said predetermined area.

6. A mobile terminal according to claim 1, further comprising:
    a calculator which calculates a moving velocity of said moving object when said on-screen position of said moving object changes, wherein said determiner determines whether or not said moving object and said predetermined area have a predetermined relationship when the moving velocity calculated by said calculator is equal to or more than a predetermined value.

7. A mobile terminal according to claim 1, further comprising:
    a recorder which records a moving path when said on-screen position of said moving object is changed by said changer, wherein said determiner determines that said on-screen position of said moving object and said predetermined area have said predetermined relationship when the moving path recorded by said recorder is included said predetermined area.

8. A locked state cancelling method of a mobile terminal capable of setting a locked state and having a detector to detect an attitude and a displayer to display a moving object on a screen, the method comprising:
    setting a predetermined area on said screen;
    changing an on-screen position of said moving object on the basis of changes of the attitude detected by said detector, wherein the on-screen position of said moving object represents a center of gravity of the moving object;
    determining whether or not said on-screen position of said moving object and said predetermined area have a predetermined relationship; and
    cancelling the locked state when said determiner determines that said on-screen position of said moving object and said predetermined area have said predetermined relationship.

9. A method of canceling a locked state of a mobile terminal, the method comprising using at least one hardware processor to:
    if the mobile terminal is in a locked state, display a screen with an object and at least one predetermined area;
    change an on-screen position of the object based on a change in an attitude of the mobile terminal, wherein the on-screen position of the object represents a center of gravity of the object;
    determine whether the on-screen position of the object has a predetermined relationship with the at least one predetermined area; and,
    if the on-screen position of the object has the predetermined relationship with the at least one predetermined area, switch the mobile terminal to an unlocked state.

10. The method of claim 9, wherein the attitude comprises an angle of the mobile terminal.

11. The method of claim 9, further comprising using the at least one hardware processor to:
    receive three-axis acceleration data from an accelerometer of the mobile terminal; and
    calculate the attitude of the mobile terminal based on the three-axis acceleration data.

12. The method of claim 11, where calculating the attitude of the mobile terminal based on the three-axis acceleration data comprises applying an inverse trigonometric function to the three-axis acceleration data.

13. The method of claim 11, further comprising using the at least one hardware processor to:
    upon display of the screen, temporarily store initial three-axis acceleration data from the accelerometer; and
    correct the attitude of the mobile terminal based on the initial three-axis acceleration data.

14. The method of claim 13, wherein correcting the attitude comprises subtracting subsequently received three-axis acceleration data from the initial three-axis acceleration data.

15. The method of claim 9, wherein the object comprises a depiction of a ball, and wherein the at least one predetermined area comprises a depiction of a hole.

16. The method of claim 15, wherein the at least one predetermined area comprises a plurality of predetermined areas comprising a plurality of depictions of a hole in different regions of the screen.

17. The method of claim 9, wherein determining whether the on-screen position of the object has a predetermined relationship with the at least one predetermined area comprises determining whether the on-screen position of the object is within the at least one predetermined area.

18. The method of claim 9, wherein the at least one predetermined area comprises a plurality of predetermined areas, and wherein determining whether the on-screen position of the object has a predetermined relationship with the plurality of predetermined areas comprises determining whether the on-screen position of the object has entered one or more of the plurality of predetermined areas in a predetermined order.

19. The method of claim 18, further comprising receiving the predetermined order from a user.

20. The method of claim 9, wherein the predetermined relationship comprises a path, and wherein determining whether the on-screen position of the object has the predetermined relationship with the at least one predetermined area comprises:

storing a plurality of on-screen positions of the object; and
    determining whether the plurality of on-screen positions represent the predetermined path.

\* \* \* \* \*